United States Patent
Fan

(10) Patent No.: US 11,410,465 B2
(45) Date of Patent: Aug. 9, 2022

(54) FACE IDENTIFICATION SYSTEM AND METHOD

(71) Applicant: Sigmastar Technology Ltd., Xia'men (CN)

(72) Inventor: Jin-Hua Fan, Shenzhen (CN)

(73) Assignee: SIGMASTAR TECHNOLOGY LTD., Xia'men (CN)

( * ) Notice: Subject to any disclaimer, the term of this patent is extended or adjusted under 35 U.S.C. 154(b) by 103 days.

(21) Appl. No.: 16/885,418

(22) Filed: May 28, 2020

(65) Prior Publication Data

US 2020/0387726 A1    Dec. 10, 2020

(30) Foreign Application Priority Data

Jun. 4, 2019    (CN) .......................... 201910483706.0

(51) Int. Cl.
*G06V 40/40*     (2022.01)
*G06V 10/143*    (2022.01)
*G06V 40/16*     (2022.01)

(52) U.S. Cl.
CPC ............ *G06V 40/40* (2022.01); *G06V 10/143* (2022.01); *G06V 40/172* (2022.01)

(58) Field of Classification Search
CPC ........... G06K 9/00899; G06K 9/00288; G06K 9/2018
See application file for complete search history.

(56) References Cited

U.S. PATENT DOCUMENTS 9,245,173 B2 *    1/2016 Lee .................... G06K 9/00281
9,305,207 B2      4/2016 Chen et al.
(Continued)

FOREIGN PATENT DOCUMENTS

CN    103294993 A    9/2013
TW    201303750 A1   1/2013
(Continued)

OTHER PUBLICATIONS

OA letter of the counterpart TW application (appl. No. 108121144) mailed on Mar. 6, 2020. Summary of the OA letter: Claims 1, 3~8, 10~14, 16~19 and 21~22 are rejected as being unpatentable over the disclosure of (CN 103294993, also published as US2013223681A1) and (TW 201401183, also published as US2013336548A1). Claims 2, 9, 15 and 20 are rejected as being unpatentable over the disclosure of (TW 201303750).

*Primary Examiner* — Santiago Garcia
(74) *Attorney, Agent, or Firm* — WPAT, PC

(57) ABSTRACT

The present disclosure discloses a face identification system that includes an image-retrieving circuit, an invisible light source and a processing circuit. The image-retrieving circuit includes light-sensing elements each including a plurality of visible light sensors and an invisible light sensor. The processing circuit executes software and firmware executable commands to execute a face identification method that includes the steps outlined below. An invisible light is emitted to an object to be identified by the invisible light source. A visible light sensed frame and an invisible light sensed frame are retrieved by using the visible and invisible light sensors. Determine whether a light reflection related parameter of the invisible light sensed frame is within a predetermined range is determined only according to the invisible light sensed frame. When the light reflection related parameter is within the predetermined range, the object to be identified is determined to be a real face.

8 Claims, 5 Drawing Sheets

(56) References Cited

U.S. PATENT DOCUMENTS

| | | | |
|---|---|---|---|
| 9,781,406 B2 | 10/2017 | Lee | |
| 9,860,521 B2 | 1/2018 | Lee | |
| 2006/0228003 A1* | 10/2006 | Silverstein | G01S 17/04 |
| | | | 382/115 |
| 2013/0088576 A1* | 4/2013 | Hsu | G01S 7/4802 |
| | | | 348/46 |
| 2013/0286236 A1* | 10/2013 | Mankowski | H04N 5/332 |
| | | | 348/222.1 |
| 2017/0068865 A1* | 3/2017 | Maalouf | G06K 9/00899 |
| 2017/0208292 A1* | 7/2017 | Smits | G01S 3/00 |
| 2019/0147280 A1* | 5/2019 | Qiu | G06K 9/38 |
| | | | 382/118 |
| 2019/0282101 A1* | 9/2019 | Tsai | A61B 5/7275 |
| 2020/0089034 A1* | 3/2020 | Liu | G06K 9/00221 |
| 2020/0293754 A1* | 9/2020 | Huang | G06K 9/00597 |
| 2021/0241517 A1* | 8/2021 | Segal | G06T 15/10 |

FOREIGN PATENT DOCUMENTS

| | | |
|---|---|---|
| TW | 201401183 A | 1/2014 |
| TW | I623911 B | 5/2018 |
| TW | I631849 B | 8/2018 |
| TW | I638334 B | 10/2018 |

\* cited by examiner

FACE IDENTIFICATION SYSTEM AND METHOD

BACKGROUND OF THE INVENTION

1. Field of the Invention

The present disclosure relates to a face identification system and a face identification method.

2. Description of Related Art

Face identification is a computer technology that performs analysis and comparison on facial visual characteristic information to perform identification of a person. Some electronic products perform corresponding operations after the user passes the face identification, e.g. unlock of a smartphone or unlock of a door of a house.

However, along with the progress of the contemporary printing technology, a high-resolution photo can be printed by a printer. Though the information of the facial characteristic can be distinguished by conventional face identification technology, the conventional face identification technology is not able to tell the printed object having a flat surface apart from the real face. Under such a condition, the electronic products can not accomplish information security by using the face identification technology.

SUMMARY OF THE INVENTION

In consideration of the problem of the prior art, an object of the present disclosure is to provide a face identification system and a face identification method.

The present disclosure discloses a face identification system that includes an image-retrieving circuit, an invisible light source and a processing circuit. The image-retrieving circuit includes light-sensing elements each including a plurality of visible light sensors and an invisible light sensor. The processing circuit is electrically coupled to the image-retrieving circuit and the invisible light source and is configured to execute software and firmware executable commands to execute a face identification method that includes the steps outlined below. An invisible light is emitted to an object to be identified by the invisible light source. A visible light sensed frame is retrieved by using the visible light sensors of the light-sensing elements. An invisible light sensed frame is retrieved by using the invisible light sensor of the light-sensing elements. Whether a light reflection related parameter of the invisible light sensed frame is within a predetermined range is determined only according to the invisible light sensed frame, wherein the light reflection related parameter is related to an angle difference between the invisible light before reflection and the invisible light after reflection. The object to be identified is determined as a real face when the light reflection related parameter is within the predetermined range.

The present disclosure also discloses a face identification method that includes the steps outlined below. An invisible light is emitted to an object to be identified by an invisible light source. A visible light sensed frame is retrieved by using a plurality of visible light sensors of a plurality of light-sensing elements of an image-retrieving circuit. An invisible light sensed frame is retrieved by using an invisible light sensor of the light-sensing elements of the image-retrieving circuit. Whether a light reflection related parameter of the invisible light sensed frame is within a predetermined range is determined only according to the invisible light sensed frame, wherein the light reflection related parameter is related to an angle difference between the invisible light before reflection and the invisible light after reflection. The object to be identified is determined as a real face when the light reflection related parameter is within the predetermined range.

The present disclosure further discloses a face identification system that includes an image-retrieving circuit, an invisible light source and a processing circuit. The image-retrieving circuit includes light-sensing elements each including a plurality of visible light sensors and an invisible light sensor. The processing circuit is electrically coupled to the image-retrieving circuit and the invisible light source and is configured to execute software and firmware executable commands to execute a face identification method that includes the steps outlined below. An invisible light is emitted to an object to be identified by the invisible light source. A visible light sensed frame is retrieved by using the visible light sensors of the light-sensing elements. An invisible light sensed frame is retrieved by using the invisible light sensor of the light-sensing elements. Color information of the visible light sensed frame is removed. A plurality of depth values are calculated according to the visible light sensed frame having the color information removed and the invisible light sensed frame. A degree of difference between the depth values is calculated as a difference value. The object to be identified is determined as a real face when the difference value is larger than a predetermined range.

The present disclosure also discloses a face identification method that includes the steps outlined below. An invisible light is emitted to an object to be identified by an invisible light source. A visible light sensed frame is retrieved by using a plurality of visible light sensors of a plurality of light-sensing elements of an image-retrieving circuit. An invisible light sensed frame is retrieved by using an invisible light sensor of the light-sensing elements of the image-retrieving circuit. Color information of the visible light sensed frame is removed. A plurality of depth values are calculated according to the visible light sensed frame having the color information removed and the invisible light sensed frame. A degree of difference between the depth values is calculated as a difference value. The object to be identified is determined as a real face when the difference value is larger than a predetermined range.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a face identification system and a face identification method to identify whether an object to be identified is a real face based on a light reflection related parameter of an invisible light sensed frame or a difference between the invisible light sensed frame and a visible light sensed frame.

Figure 1:
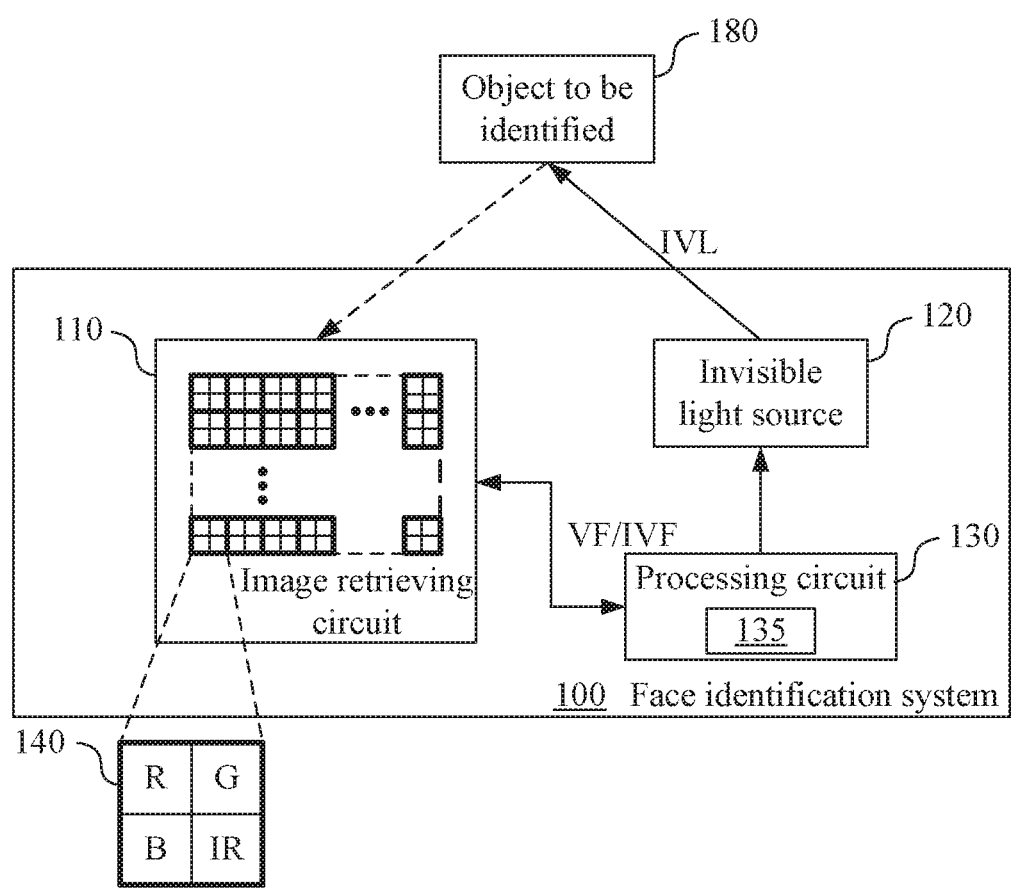
FIG. 1 is a block diagram of a face identification system in an embodiment of the present invention.

Reference is now made to FIG. 1. FIG. 1 is a block diagram of a face identification system 100 in an embodiment of the present invention. The face identification system 100 is configured to perform face identification to determine whether an object to be identified 180 is a real face and further determine whether such face matches a predetermined face data when the object to be identified 180 is a real face.

The face identification system 100 includes an image-retrieving circuit 110, an invisible light source 120 and a processing circuit 130.

The image-retrieving circuit 110 includes light-sensing elements 140. In an embodiment, the light-sensing elements 140 are arranged as an array to perform light sensing and image-retrieving on external environment. The sensing result of each of the light-sensing elements 140 forms a pixel. All the pixels retrieved by all the light-sensing elements 140 form a sensed frame.

Each of the light-sensing elements 140 includes a plurality of visible light sensors and an invisible light sensor. In an embodiment, the visible light sensors include a red light sensor R, a green light sensor G and a blue light sensor B. The invisible light sensor is an infrared light sensor IR. As a result, the light-sensing elements 140 disposed in a single image-retrieving circuit 110 can generate a visible light sensed frame VF and an invisible light sensed frame IVF respectively according to the visible light sensors and the invisible light sensor. In an embodiment, the visible light sensed frame VF is a color frame and the invisible light sensed frame IVF is a gray-scale frame.

The invisible light source 120 is configured to emit an invisible light IVL to the object to be identified 180. In an embodiment, the invisible light source 120 is an infrared light source. As a result, the invisible light IVL emitted by the invisible light source 120 is an infrared light. The light-sensing elements 140 can sense the invisible light IVL according to the infrared light sensor IR included therein to generate the invisible light sensed frame IVF.

The processing circuit 130 is electrically coupled to the image-retrieving circuit 110 and the invisible light source 120 and can be configured by one or more than one microprocessors. The processing circuit 130 is configured to execute software and firmware executable commands 135 to execute the function of the face identification system 100.

More specifically, the processing circuit 130 can retrieve the software and firmware executable commands 135 from a storage module (not illustrated) in the face identification system 100 that include firmware/driver of the hardware modules such as, but not limited to the image-retrieving circuit 110 and the invisible light source 120 and other commands used to operate and control the hardware modules such as, but not limited to the image-retrieving circuit 110 and the invisible light source 120. The processing circuit 130 can thus operate and control the hardware modules such as, but not limited to the image-retrieving circuit 110 and the invisible light source 120 to perform face identification.

The operation of the face identification system 100 is described in detail in the following paragraphs in accompany with FIG. 1.

At first, the processing circuit 130 controls the invisible light source 120 to emit the invisible light IVL to the object to be identified 180.

Subsequently, by using the visible light sensors of the light-sensing elements 140, such as but not limited to the red light sensor R, the green light sensor G and the blue light sensor B, the processing circuit 130 retrieves the visible light sensed frame VF. Further, by using the invisible light sensor of the light-sensing elements 140, such as but not limited to the infrared light sensor IR, the processing circuit 130 retrieves the invisible light IVL reflected by the object to be identified 180 to retrieve the invisible light sensed frame IVF.

In an embodiment, the processing circuit 130 determines whether a light reflection related parameter of the invisible light sensed frame IVF is within a predetermined range only according to the invisible light sensed frame IVF. The object to be identified 180 is determined as a real face when the light reflection related parameter is within the predetermined range. In an embodiment, the light reflection related parameter is related to an angle difference between the invisible light before reflection and the invisible light after reflection.

Figure 2A:
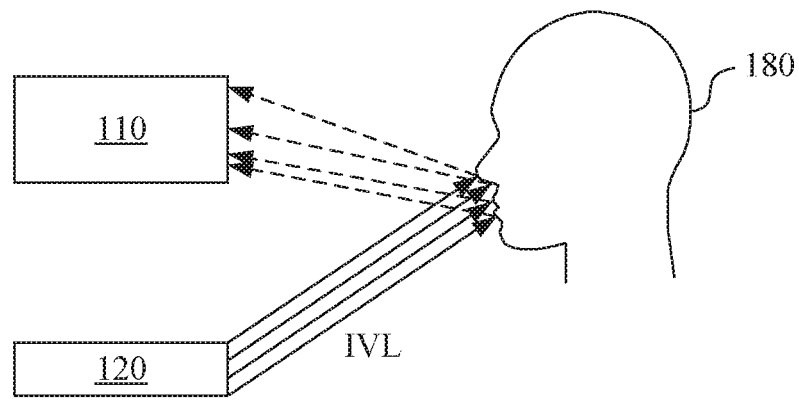
FIG. 2A is a diagram of the image-retrieving circuit, the invisible light source and the object to be identified in FIG. 1 in an embodiment of the present invention.
Figure 2B:
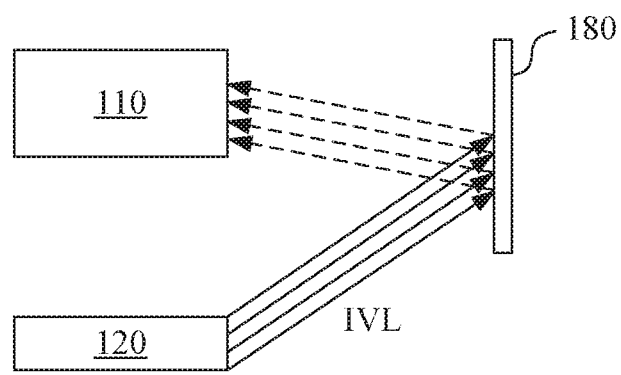
FIG. 2B is a diagram of the image-retrieving circuit, the invisible light source and the object to be identified in FIG. 1 in an embodiment of the present invention.

Reference is now made to FIG. 2A and FIG. 2B at the same time. FIG. 2A and FIG. 2B are diagrams of the image-retrieving circuit 110, the invisible light source 120 and the object to be identified 180 in FIG. 1 in an embodiment of the present invention.

In an embodiment, the invisible light IVL emitted by the invisible light source 120 includes a plurality of invisible light beams parallel to each other as shown in FIG. 2A and FIG. 2B. Preferably, the invisible light source 120 emits the invisible light IVL having a certain angle relative to an axis formed by the image-retrieving circuit 110 and the object to be identified 180.

After the invisible light IVL is reflected by the object to be identified 180, the reflected invisible light beams have different reflection angles if the object to be identified 180 has an uneven surface, e.g. the face illustrated in FIG. 2A. The invisible light sensed frame IVF generated by the infrared sensor IR in the light-sensing elements 140 of the image-retrieving circuit 110 thus includes irregular light speckles.

On the contrary, if the object to be identified 180 has a flat surface, e.g. the face printed on a paper illustrated in FIG. 2B, the reflected invisible light beams have the same reflection angle. The invisible light sensed frame IVF generated by the infrared sensor IR in the light-sensing elements 140 of the image-retrieving circuit 110 thus includes regular light speckles.

As a result, in an embodiment, the light reflection related parameter of the invisible light sensed frame IVF includes a degree of difference of light speckle distances. The processing circuit 130 identifies the object to be identified 180 as the real face when the degree of difference of the light speckle distances is larger than a predetermined value.

In different embodiments, the degree of difference of light speckle distances may have different definitions. For example, a plurality of values of the degree of difference can be predetermined in advanced, in which each of the values corresponds to a difference of light speckle distances that exceeds a certain ratio. The processing circuit 130 can determine the value of the degree of difference of light speckle distances based on the sensing result of the infrared light sensor IR and compare the value with the predetermined values to determine whether the object is a real face.

Figure 3A:
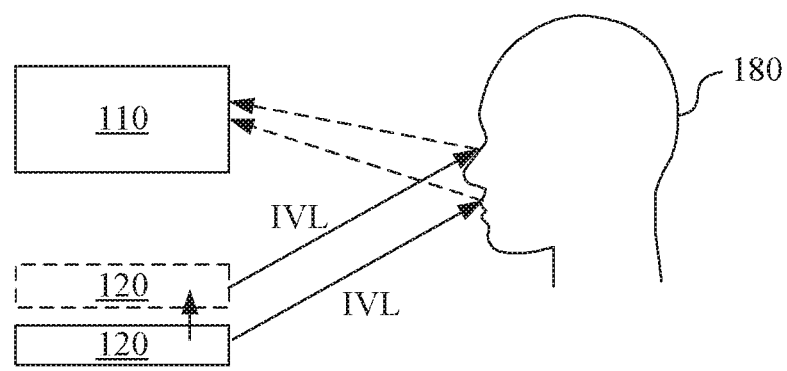
FIG. 3A is a diagram of the image-retrieving circuit, the invisible light source and the object to be identified in FIG. 1 in an embodiment of the present invention.
Figure 3B:
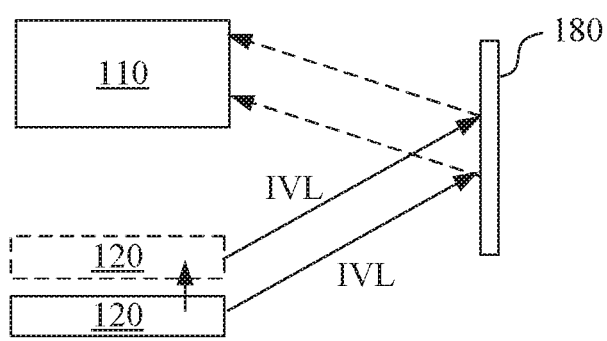
FIG. 3B is a diagram of the image-retrieving circuit, the invisible light source and the object to be identified in FIG. 1 in an embodiment of the present invention.

Reference is now made to FIG. 3A and FIG. 3B at the same time. FIG. 3A and FIG. 3B are diagrams of the image-retrieving circuit 110, the invisible light source 120 and the object to be identified 180 in FIG. 1 in an embodiment of the present invention.

In another embodiment, the invisible light IVL emitted by the invisible light source 120 includes one or more than one invisible light beams. In FIG. 3A and FIG. 3B, a single light beam is illustrated as an example. Preferably, the invisible light source 120 emits the invisible light IVL having a certain angle relative to an axis formed by the image-retrieving circuit 110 and the object to be identified 180.

The invisible light source 120 is configured to perform location displacement to change an incident direction of lights toward the object to be identified 180. After the invisible light IVL is reflected by the object to be identified 180, a larger deviation amount of reflection angle of the lights can be discovered in the invisible light sensed frame IVF generated by the infrared sensor IR in the light-sensing elements 140 of the image-retrieving circuit 110 due to the different reflection locations and the uneven surface if the object to be identified 180, e.g. the face, has an uneven surface.

On the contrary, if the object to be identified 180 has a flat surface, e.g. the face printed on a paper, the reflected invisible light beams having identical reflection angles can be discovered in the invisible light sensed frame IVF generated by the infrared sensor IR in the light-sensing elements 140 of the image-retrieving circuit 110 due to the flat surface.

As a result, in an embodiment, the light reflection related parameter of the invisible light sensed frame IVF includes a deviation amount of a reflection angle of lights such that the processing circuit 130 identifies the object to be identified 180 as the real face when the deviation amount of a reflection angle of lights is larger than a predetermined value.

In yet another embodiment, the light reflection related parameter includes a material reflection coefficient. The processing circuit 130 can retrieve the material reflection coefficients of different objects such as a face, a paper, a metal or a glass from a storage module (not illustrated) in the face identification system 100 to determine the material reflection coefficient of the object to be identified 180 according to the light reflection result of the invisible light sensed frame IVF and further perform comparison between the material reflection coefficient of the object to be identified 180 and the material reflection coefficient of various objects. When the material reflection coefficient determined according to the invisible light sensed frame IVF is within a predetermined range, such as but not limited to a range of difference from the material reflection coefficient of the face that is smaller than a certain offset value, the processing circuit 130 identifies the object to be identified 180 as the real face.

In the embodiments described above, the processing circuit 130 determines whether the object to be identified 180 is a real face according to the invisible light sensed frame IVF sensed by the invisible light sensor. However, in other embodiments, the processing circuit 130 can determine whether the object to be identified 180 is a real face according to both the visible light sense frame VF sensed by the visible light sensor and the invisible light sensed frame IVF sensed by the invisible light sensor.

In an embodiment, after the visible light sense frame VF and the invisible light sensed frame IVF are retrieved, the processing circuit 130 removes color information of the visible light sensed frame VF such that the visible light sensed frame VF becomes a gray-scale visible light sensed frame YE Further, the processing circuit 130 calculates a plurality of depth values according to the visible light sensed frame VF having the color information removed and the invisible light sensed frame IVF. The processing circuit 130 calculates the degree of difference between the depth values. When the degree of difference is larger than a predetermined value, the processing circuit 130 identifies the object to be identified 180 as a real face.

In different embodiments, the degree of difference between the depth values can have different definitions. For example, a plurality of values of the degree of difference can be predetermined in advanced, in which each of the values corresponds to a difference that exceeds a certain ratio. The processing circuit 130 can determine the value of the degree of difference of between the depth values based on the sensing result of the visible light sensors and the invisible light sensor and compare the value with the predetermined values to determine whether the object is a real face.

As a result, after the invisible light IVL is reflected by the object to be identified 180, the difference between the depth values is larger if the object to be identified 180, e.g. the face, has an uneven surface. On the contrary, if the object to be identified 180 has a flat surface, e.g. the face printed on a paper, the depth values have identical values due to the flat surface. As a result, when the degree of difference between the depth values is larger than a predetermined value, the processing circuit 130 identifies the object to be identified 180 as a real face.

It is appreciated that in practical application, either one or a combination of at least two of the embodiments described above can be used to determine whether the object to be identified 180 is a real face.

For example, in an embodiment, the processing circuit 130 performs determination simultaneously according to the degree of difference of light speckle distances of the invisible light sensed frame IVF and according to the degree of difference between the depth values of the visible light sensed frame VF and the invisible light sensed frame IVF. The processing circuit 130 only identifies the object to be identified 180 as a real face when the degree of difference of light speckle distances is larger than the corresponding predetermined value and the degree of difference between the depth values is larger than the corresponding predetermined value.

In an embodiment, after the object to be identified 180 is identified as a real face, the processing circuit 130 performs characteristic comparison on the visible light sensed frame VF with a face database stored in such as, but a storage module (not illustrated) included in the face identification system 100 such that the object to be identified 180 is determined to pass the face identification when the visible light sensed frame VF includes a content matching a predetermined face data. In an embodiment, the processing circuit 130 can perform corresponding operations after the object to be identified 180 passes the face identification. However, the present invention is not limited thereto.

In different embodiments, the processing circuit 130 performs comparison and identification on the visible light sensed frame VF with the face data according to difference comparison technologies. The present invention is not limited to a specific comparison technology.

In different embodiment, the face identification system of the present invention further includes a visible light source (not illustrated).

Base on the embodiments described above, the face identification system of the present invention can retrieve the invisible light sensed frame by disposing the invisible light source and by using the light-sensing elements that includes the invisible light sensor in the image-retrieving circuit, determine whether the object to be identified is a real face according to the light reflection related parameter of the invisible light sensed frame or simultaneously according to the difference between the invisible light sensed frame and the visible light sensed frame and further determine whether the real face passes the face identification according to the visible light sensed frame.

Figure 4:
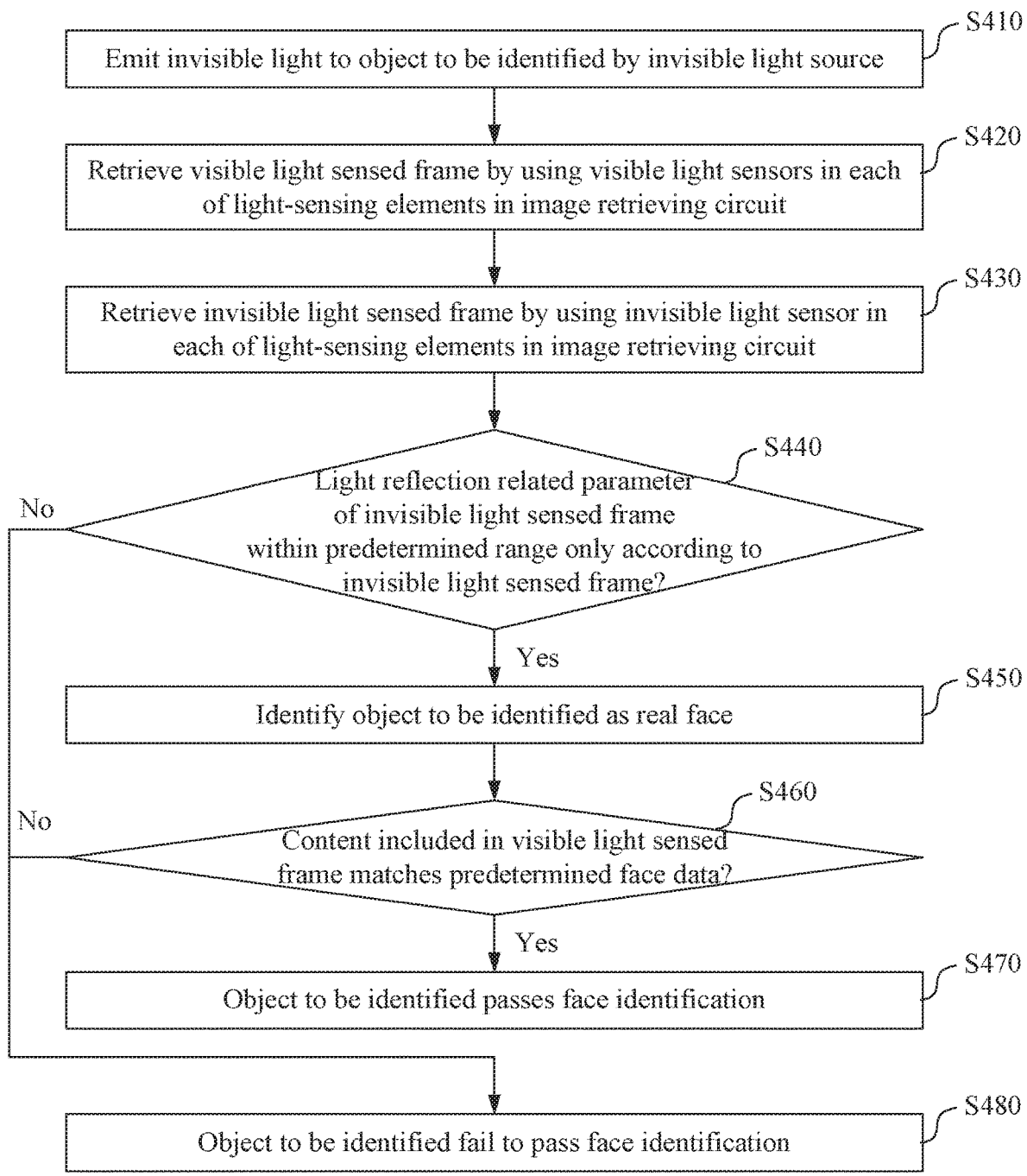
FIG. 4 is a flow chart of a face identification method in an embodiment of the present invention.

Reference is now made to FIG. 4. FIG. 4 is a flow chart of a face identification method 400 in an embodiment of the present invention.

Besides the system described above, the present invention further provides the face identification method 400 that can be use in the face identification system 100 in FIG. 1. As illustrated in FIG. 4, an embodiment of the face identification method 400 includes the following steps.

In step S410, the processing circuit 130 controls the invisible light source 120 to emit the invisible light IVL to the object to be identified 180.

In step S420, the processing circuit 130 retrieves the visible light sensed frame VF by using the visible light sensors, such as but not limited to the red light sensor R, the green light sensor G and the blue light sensor B included in each of the light-sensing elements 140 in the image-retrieving circuit 110.

In step S430, the processing circuit 130 retrieves the invisible light sensed frame IVF by using the invisible light sensor, such as but not limited to the infrared light sensor IR included in each of the light-sensing elements 140 in the image-retrieving circuit 110.

In step S440, the processing circuit 130 determines whether the light reflection related parameter of the invisible light sensed frame IVF is within the predetermined range only according to the invisible light sensed frame.

In step S450, the processing circuit 130 identified the object to be identified 180 as a real face when the light reflection related parameter is within the predetermined range.

In step S460, the processing circuit 130 performs characteristic comparison on the visible light sensed frame VF with the face database to determine whether the content included in the visible light sensed frame VF matches the predetermined face data.

In step 470, the processing circuit 130 determines that the object to be identified 180 passes the face identification when the visible light sensed frame VF includes the content matching the predetermined face data.

In step 480, the processing circuit 130 determines that the object to be identified 180 fails to pass the face identification when the light reflection related parameter is determined to be not within the predetermined range in step 440 or when the visible light sensed frame VF is determined to not include the content matching the predetermined face data in step 460.

Figure 5:
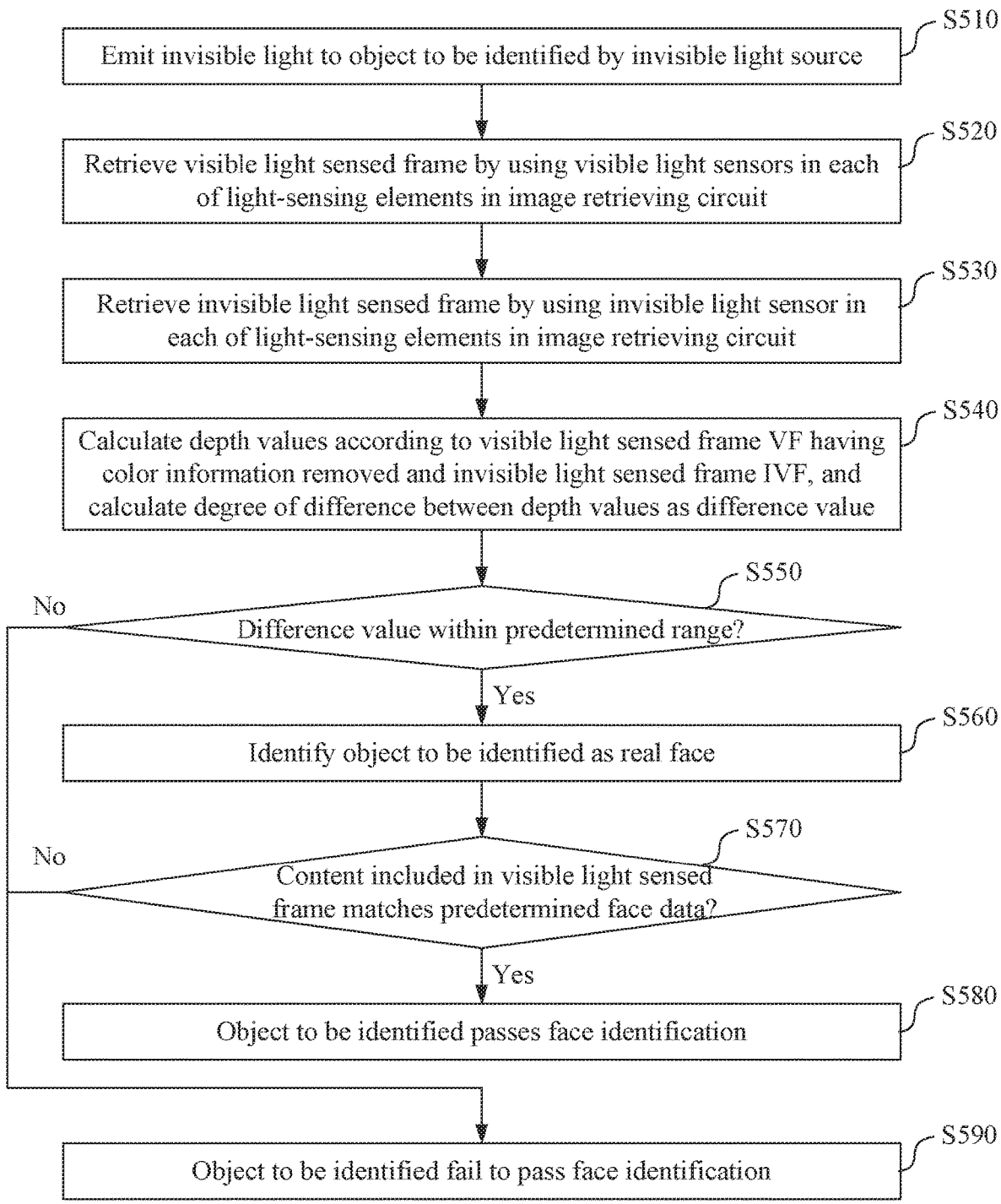
FIG. 5 is a flow chart of a face identification method in an embodiment of the present invention.

Reference is now made to FIG. 5. FIG. 5 is a flow chart of a face identification method 500 in an embodiment of the present invention.

Besides the system described above, the present invention further provides the face identification method 500 that can be use in the face identification system 100 in FIG. 1. As illustrated in FIG. 5, an embodiment of the face identification method 500 includes the following steps.

In step S510, the processing circuit 130 controls the invisible light source 120 to emit the invisible light IVL to the object to be identified 180.

In step S520, the processing circuit 130 retrieves the visible light sensed frame VF by using the visible light sensors, such as but not limited to the red light sensor R, the green light sensor G and the blue light sensor B included in each of the light-sensing elements 140 in the image-retrieving circuit 110. In an embodiment, the color information of the visible light sensed frame VF is removed subsequently.

In step S530, the processing circuit 130 retrieves the invisible light sensed frame IVF by using the invisible light sensor, such as but not limited to the infrared light sensor IR included in each of the light-sensing elements 140 in the image-retrieving circuit 110.

In step S540, the processing circuit 130 calculates depth values according to the visible light sensed frame VF having the color information removed and the invisible light sensed frame IVF, and calculates a degree of difference between the depth values as a difference value.

In step S550, the processing circuit 130 determines whether the difference value is within a predetermined range.

In step S560, the processing circuit 130 identified the object to be identified 180 as a real face when the difference value is within the predetermined range.

In step S570, the processing circuit 130 performs characteristic comparison on the visible light sensed frame VF with the face database to determine whether the content included in the visible light sensed frame VF matches the predetermined face data.

In step 580, the processing circuit 130 determines that the object to be identified 180 passes the face identification when the visible light sensed frame VF includes the content matching the predetermined face data.

In step 590, the processing circuit 130 determines that the object to be identified 180 fails to pass the face identification when the difference value is determined to be not within the predetermined range in step 550 or when the visible light sensed frame VF is determined to not include the content matching the predetermined face data in step 570.

It is appreciated that the embodiments described above are merely an example. In other embodiments, it should be appreciated that many modifications and changes may be made by those of ordinary skill in the art without departing, from the spirit of the invention.

In summary, the face identification system and the face identification system method in the present invention can retrieve the invisible light sensed frame and the visible light sensed frame by using the image-retrieving circuit to determine whether the object to be identified is a real face according to the light reflection related parameter of the invisible light sensed frame or simultaneously according to the difference between the invisible light sensed frame and the visible light sensed frame and further determine whether the real face passes the face identification according to the visible light sensed frame.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A face identification system, comprising:
   an image-retrieving circuit comprising light-sensing elements each comprising a plurality of visible light sensors and an invisible light sensor;
   an invisible light source; and
   a processing circuit electrically coupled to the image-retrieving circuit and the invisible light source and configured to execute software and firmware executable commands to execute a face identification method that comprises:
      emitting a plurality of invisible light beams parallel to each other to an object to be identified by the invisible light source;
      retrieving a visible light sensed frame by using the visible light sensors of the light-sensing elements;
      retrieving an invisible light sensed frame by using the invisible light sensor of the light- sensing elements;
      determining whether a degree of difference of light speckle distances of the invisible light sensed frame is larger than a predetermined value, wherein the degree of difference of light speckle distances is related to an angle difference between the invisible light before reflection and the invisible light after reflection; and
      determining the object to be identified as an uneven surface when the degree of difference of light speckle distances is larger than the predetermined value.

2. The face identification system of claim 1, wherein the face identification method further comprises:
   performing characteristic comparison on the visible light sensed frame with a face database such that the object to be identified is determined to pass the face identification when the visible light sensed frame comprises a content matching a predetermined face data.

3. The face identification system of claim 1, wherein each of the invisible light beams is an infrared light and the invisible light sensor is an infrared light sensor, and the visible light sensors comprises a red light sensor, a green light sensor and a blue light sensor.

4. The face identification system of claim 1, further comprising a visible light source.

5. A face identification method, comprising:
   emitting a plurality of invisible light beams parallel to each other to an object to be identified by an invisible light source;
   retrieving a visible light sensed frame by using a plurality of visible light sensors of a plurality of light-sensing elements of an image-retrieving circuit;
   retrieving an invisible light sensed frame by using an invisible light sensor of the light-sensing elements of the image-retrieving circuit;
   determining whether a degree of difference of light speckle distances of the invisible light sensed frame is larger than a predetermined value, wherein the degree of difference of light speckle distances is related to an angle difference between the invisible light before reflection and the invisible light after reflection; and
   determining the object to be identified as an uneven surface when the degree of difference of light speckle distances is larger than the predetermined value.

6. The face identification method of claim 5, further comprising:
   performing characteristic comparison on the visible light sensed frame with a face database such that the object to be identified is determined to pass the face identification when the visible light sensed frame comprises a content matching a predetermined face data.

7. The face identification method of claim 5, wherein each of the invisible light beams is an infrared light and the invisible light sensor is an infrared light sensor, and the visible light sensors comprises a red light sensor, a green light sensor and a blue light sensor.

8. An object identification system, comprising:
   an image-retrieving circuit comprising light-sensing elements each comprising a plurality of visible light sensors and an invisible light sensor;
   an invisible light source; and
   a processing circuit electrically coupled to the image-retrieving circuit and the invisible light source and configured to execute software and firmware executable commands to execute an object identification method that comprises:
      emitting a plurality of invisible light beams parallel to each other to an object to be identified by the invisible light source;
      retrieving a visible light sensed frame by using the visible light sensors of the light-sensing elements;
      retrieving an invisible light sensed frame by using the invisible light sensor of the light- sensing elements;
      determining whether a degree of difference of light speckle distances of the invisible light sensed frame is larger than a predetermined value, wherein the degree of difference of light speckle distances is related to an angle difference between the invisible light before reflection and the invisible light after reflection; and
      determining the object to be identified as an uneven surface when the degree of difference of light speckle distances is larger than the predetermined value.

* * * * *